July 10, 1928.
J. W. J. KAFFER
1,677,032
ELECTRICAL HEATING AND COOKING APPARATUS
Filed Nov. 9, 1926
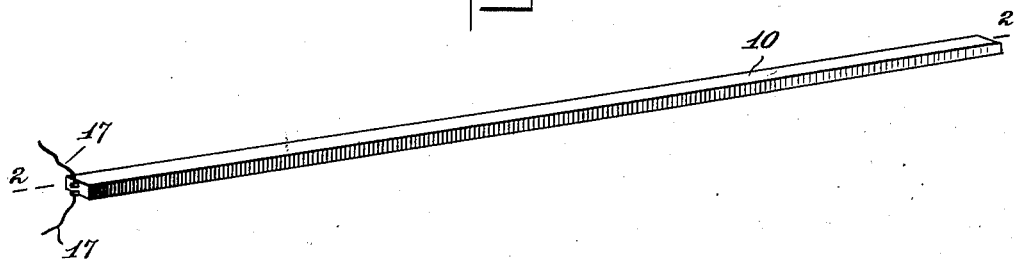
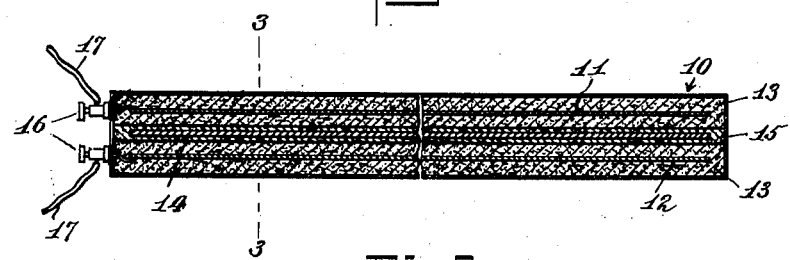
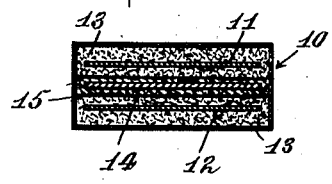
WITNESSES
INVENTOR
J. W. J. Kaffer.
BY
ATTORNEYS Patented July 10, 1928.

1,677,032

UNITED STATES PATENT OFFICE.

JOAN WILLEM JULES KAFFER, OF MEESTER-CORNELIS, JAVA, DUTCH EAST INDIES.

ELECTRICAL HEATING AND COOKING APPARATUS.

Application filed November 9, 1926. Serial No. 147,352.

My invention relates to a means for generating heat and utilizing the heat by radiation so that the surrounding fluid whether gaseous or liquid, will take up the heat and enable it to be utilized for practical purposes.

The invention particularly relates to a heating system involving the decomposition of water into its hydrogen and oxygen by means of an electric current and utilizing the phenomenon of catalysis for again converting the freed hydrogen and oxygen into a water vapor.

The general object of my invention is to utilize in a practical manner the phenomenon of the decomposition of water by an electric current and the phenomenon of catalysis for re-combining the freed hydrogen and oxygen into water vapor.

More specifically, the invention has for its object to provide a bendable unit which may be given any desired shape in the construction and assemblage of a heating unit of the character referred to.

The nature of my invention and its distinguishing features and advantages will clearly appear as the description proceeds.

Reference is to be had to the accompanying drawings forming a part of this specification, it being understood that the drawings are merely illustrative of one practical means for carrying out the invention.

Figure 1 is a perspective view of a heating unit embodying my invention;

Figure 2 is a longitudinal vertical section through said unit, a portion of the unit being broken out;

Figure 3 is a transverse vertical section in a plane indicated by the line 3—3, Figure 2.

For the purpose of carrying out my invention in practice, I provide an elongated flat metal box 10 closed at all sides when the unit is finished. Two elongated and advantageously flat electrodes 11, 12 are provided and are disposed longitudinally in the box 10. Said electrodes 11, 12 are enclosed by a covering of asbestos 13 or other spongy or porous heat-resisting and non-conducting material.

The electrodes 11 and 12 are spaced from each other and between the same is disposed a strip 14 of platinum which also is enclosed by a covering 15 of asbestos or its equivalent. The electrodes 11, 12 have connection with external binding posts 16 or equivalent terminals for the connection of lead wires 17.

For the electrodes 11, 12 and the metal box 10, it is necessary to select an alloy which is proof against the test of acid or alkaline solution as well as against the high temperature developed in the operation of the described unit.

In the drawing the metal box is represented in its most practical form, that is, a flat form so that the whole unit in effect has the form of a broad metal band which can be coiled in a cooking apparatus, for example, in the form of a spiral heating element or it can be inserted in other heating apparatus in the form of straight strips or in ring form. In producing the unit in a form to be coiled or otherwise bent into various shapes, the material of the box 10 and the material of the electrodes, 11, 12 and the platinum strip 14, is required to be very pliable.

In use, a vacuum is produced in the metal box 10 and a slightly acid water or an alkaline water is poured into the box, which is then closed fluid-tight by means of brazing soldering or otherwise. When an electrical current is caused to pass through the electrodes 11, 12 by connecting up the lead wires 17 in circuit, the water in the metal box is de-composed by the electric current into hydrogen and oxygen. These two gases are at once converted into water vapor by catalysis caused by the presence of the platinum. The intermittent de-composing and combining referred to develops a very intense heat and the electric current is thus converted into heat for a useful purpose by reason of the heat generated in the box being communicated by radiation to surrounding fluid, either air or liquid.

I would mention that care should be taken that only such quantity of water should be supplied to the vacuum box 10 that with the high temperature which ensues from the turning on of the electric current, the pressure of the water vapor becomes only so that it equals the pressure of the fluid, such as a liquid, air or gas to be warmed since otherwise, there would be a liability of the box 10 being exploded. The water and acid or alkali to be used must be chemically pure so that the electrodes do not become corroded. In this connection, I would state that the use of distilled water is inoperative for efficiency and success.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a device for generating heat, a fluid-tight casing constituting a fluid receptacle for water, two spaced electrodes disposed in said casing and having means to connect said electrodes with the wires of an electric circuit, and a catalytic element disposed in said casing between said electrodes, said electrodes and said element being out of electrical contact with said casing and with one another.

2. In a device for generating heat, a fluid-tight casing constituting a fluid receptacle for water, two spaced electrodes disposed in said casing and having means to connect said electrodes with the wires of an electric circuit, and a catalytic element disposed in said casing between said electrodes, said electrodes and said element being out of electrical contact with said casing and with one another; together with asbestos covering for said electrodes and said catalytic element.

3. In a device for generating heat, a fluid-tight casing constituting a fluid receptacle for water, two spaced electrodes disposed in said casing and having means to connect said electrodes with the wires of an electric circuit, and a catalytic element disposed in said casing between said electrodes, said electrodes and said element being out of electrical contact with said casing and with one another, said casing, said electrodes, and said catalytic element being formed of pliable metal.

JOAN WILLEM JULES KAFFER.